United States Patent [19]

Machin

[11] Patent Number: 4,691,401
[45] Date of Patent: Sep. 8, 1987

[54] WASHING APPARATUS FOR A MOTOR VEHICLE

[76] Inventor: Roy Machin, Im Kälblesbiegel 16, 741 Reutlingen 3, Fed. Rep. of Germany

[21] Appl. No.: 838,273

[22] Filed: Mar. 10, 1986

[30] Foreign Application Priority Data

Mar. 13, 1985 [DE] Fed. Rep. of Germany ....... 3508945

[51] Int. Cl.$^4$ .............................................. B60S 3/06
[52] U.S. Cl. ................................. 15/53 A; 15/DIG. 2; 318/282
[58] Field of Search ........... 15/53 A, 53 AB, DIG. 2, 15/97 B; 318/39, 280–282, 286, 432

[56] References Cited

U.S. PATENT DOCUMENTS 3,662,418   5/1972   Kamiya ............................. 15/53 A
3,823,356   7/1974   Paavola et al. ................. 15/53 A X

FOREIGN PATENT DOCUMENTS 2522872   3/1976   Fed. Rep. of Germany .
0092140   5/1985   Japan ............................. 15/DIG. 2

*Primary Examiner*—Edward L. Roberts
*Attorney, Agent, or Firm*—Karl F. Ross; Herbert Dubno

[57] ABSTRACT

A washing apparatus for an automotive vehicle having at least one washing brush with a substantially vertically oriented rotation axis, a brush mechanism for guiding and transporting the washing brush on a course over and around the automotive vehicle to be washed, and a control mechanism including a reversing drive for the washing brush and for the control of the washing apparatus. To avoid damage of the washing brush, a sensing element connected to the control mechanism is provided which responds to a damaging catching of the washing brush during rotation and travel over its course and reverses the rotation direction of the washing brush by acting on the control mechanism. Any of various criteria, including decrease of rotational motion of the brush, changes in brush orientation and torque, and drive-motor current changes are used by the sensing element in determining when to respond, and thus to reverse at least temporarily the rotation direction of the washing brush.

13 Claims, 6 Drawing Figures

WASHING APPARATUS FOR A MOTOR VEHICLE

FIELD OF THE INVENTION

My present invention relates to an apparatus for automatically washing a self-propelled or motor vehicle and, more particularly, to a car wash with a mechanism for guiding one or more wash brushes over the surface of a vehicle to be washed.

BACKGROUND OF THE INVENTION

A washing apparatus for a motor vehicle can comprise a plurality of brushes including at least one washing brush with a substantially vertically oriented rotation axis, a brush mechanism for guiding and transporting the washing brushes on a course over and around the self-propelled vehicle, and a control mechanism for the course of the washing brush and for control of the washing apparatus.

One such washing apparatus is described in a brochure "Euro. Combi" of the Kleindienst firm, Augsburg, Germany. It uses lateral washing brushes with substantially vertical rotation axes in addition to other washing brushes which are guided over and around the front, the sides and the rear surfaces of the vehicle being washed.

In order to avoid dirty vertical streaks, which can remain on the front and rear surfaces, both lateral brushes move back and forth over the middle portions of the surfaces of the back or front together about 20 cm to one side of the middle and then subsequently to the same extent to the other side of the middle.

From a rear surface of the vehicle in some cases, a part of the vehicle, for example a trailer hitch or coupler at the vehicle rear, can protrude so that together with another vehicle part, for example a bumper, it can form a convergent slot or gap in which the bristles of a lateral washing brush wedge or get caught, whereby the washing brush can be damaged by a forced stoppage of its drive motor and/or the tearing out of the bristles.

OBJECTS OF THE INVENTION

It is an object of my invention to provide an improved washing apparatus for a motor vehicle in which the aforedescribed drawbacks are obviated.

It is also an object of my invention to provide an improved washing apparatus for an automotive vehicle provided with a trailer hitch, in which damage to the lateral washing brushes and their drive motors, because of catching or wedging of bristles of the washing brushes in a slot or gap in the structure of the vehicle is prevented without stopping the washing apparatus.

SUMMARY OF THE INVENTION

These objects and others which will become more readily apparent hereinafter are attained, in accordance with my invention, in an automatic washing apparatus for an automotive vehicle comprising at least one washing brush with a substantially vertically oriented rotation axis, a brush mechanism for guiding and transporting the washing brush on a course over and around the automotive vehicle to be washed, and a control mechanism for the course of the washing brush and for control of the washing apparatus.

According to my invention, the washing apparatus has a sensing element connected to the control mechanism, which responds to a potentially detrimental catching or snagging of the washing brush during its rotation or travel over its course and reverses the rotation direction of the working brush by acting on the control mechanism.

In this way when any of a variety of criteria for a situation which can cause damage to a lateral washing brush arise, a rotation direction reversal at least briefly, of the washing brush occurs. Thus the caught bristles can be freed from any gaps, slots or irregularities in the vehicle structure. Also the washing brush then is liberated so that it can continue to rotate and no damage occurs.

Advantageously, at each and every response of the sensing element, the direction of rotation of the washing brush is reversed. In one embodiment of my invention, the direction of rotation is reversed only temporarily during a short time span which is long enough to free it.

The sensing element in another embodiment of my invention responds when the decrease of the rotational speed of the washing brush exceeds a predetermined limiting value. Alternatively the sensing element can be structured to respond when the reduction of the rotational motion of the washing brush exceeds a predetermined limiting value. In yet another embodiment, the sensing element responds when the angle at which the rotation axis is slanted exceeds a predetermined limiting value. Another form of the sensing element responds when the torque on a supporting member for the washing brush with the rotation axis of the washing brush slanted exceeds a predetermined limiting value. In another embodiment, the sensing element responds when the current used by the washing brush drive motor exceeds a predetermined limiting value. Alternatively, the power consumed by the drive motor or the rate at which the current for the drive motor increases, can be used as criteria under which the sensing element responds.

By definition, the brush mechanism comprises a traveling frame with a transverse rail resting on two longitudinal rails on movable carriages on each rail, wherein trolleys supporting washing brushes and their drive motors are driven on the transverse rail.

BRIEF DESCRIPTION OF THE DRAWING

The above and other objects, features, and advantages of my invention will become more readily apparent from the following description, reference being made to the accompanying highly diagrammatic drawing, in which.

SPECIFIC DESCRIPTION

Figure 1:
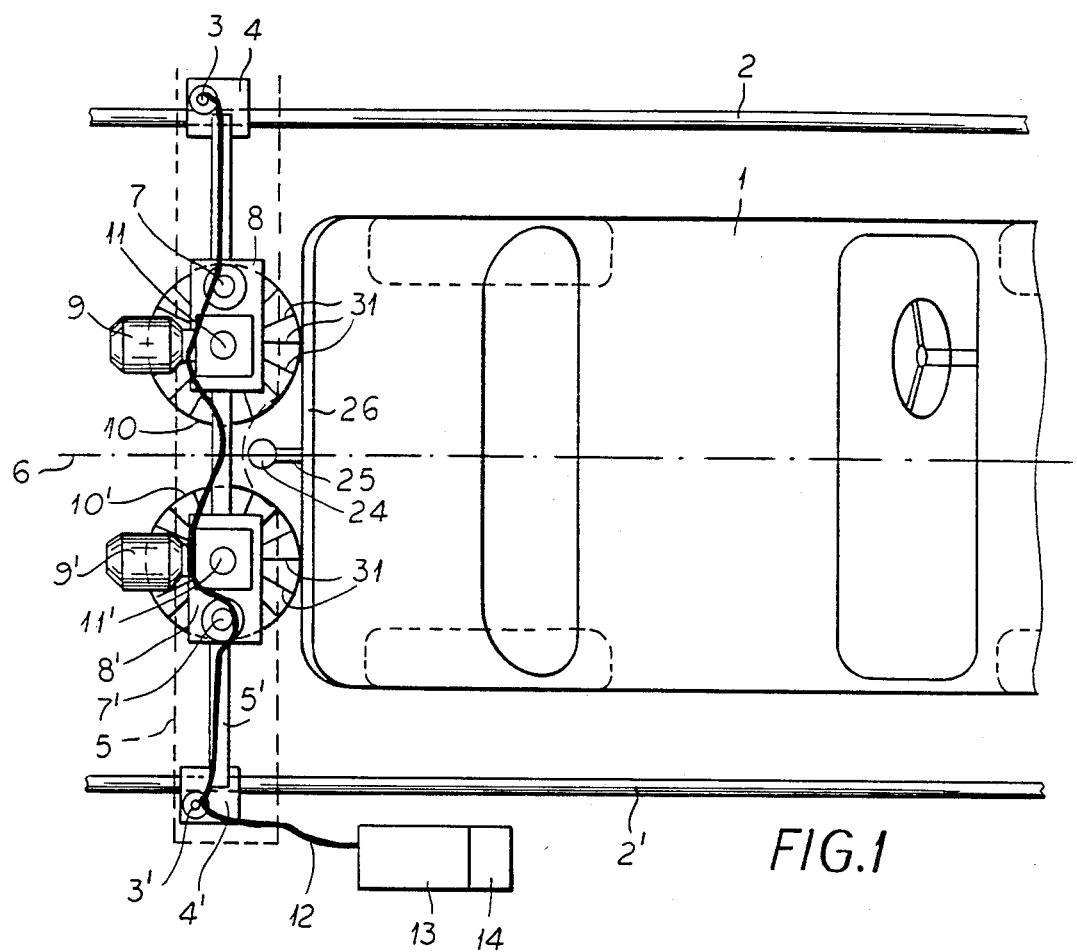
FIG. 1 is a top plan view of a first embodiment of the washing apparatus for an automotive vehicle according to my invention.

A horizontal roof brush and other rotary washing brushes for the flanks, wheels and the like, which will be present in the washing apparatus, have not been illustrated in the drawing.

A vehicle 1 to be washed is positioned between two longitudinally running rails 2 and 2', on which a traveling frame 5 resting on two movable carriage members 4 and 4' driven by longitudinally traveling drive motors 3 and 3' travels back and forth in accordance with the principles described in the aforementioned brochure.

The traveling frame 5 has a transverse rail 5', on which two trolleys or carriages 8 and 8' driven by transverse trolley drive motors 7 and 7' are drivable transversely.

Each of the trolleys 8 and 8' carries a washing brush 10 or 10' which is rotatably driven by a brush drive motor 9 or 9' about the respective substantially vertical rotation axis 11 or 11'.

All six drive motors 3,3',7,7',9, and 9' of the traveling frame 5 are attached by a flexible cable 12 with a switching and control unit 13 spaced away from the traveling frame 5.

The control unit 13 is connected with at least one sensing element 14 for the retardation of rotation of one of these brushes. In this embodiment the element 14 is a sensor through which current for the washing brush drive motors 9 and 9' flows, which compares the actual motor current with a predetermined standard value for the motor current and also with a second threshold value lying above the first relevant threshold value for the control of the washing brush 10 or 10', which permits the rapid reversal of the brush drive mechanism when the threshhold is exceeded.

In FIG. 1 both washing brushes 10 and 10' are shown in a position on their course around the vehicle 1, on which they move toward and away from each other. They meet together in the center of the vehicle on its longitudinal axis and execute a small back and forth motion transversely, in order to detect and cross the center of the top surface of the motor vehicle.

As is shown in FIG. 1 a trailer hitch device comprising a coupler 24 attached to a mounting bar 25 on the vehicle 1, can project with a small clearance from under the bumper 26 and together with the bumper 26, form a wedge-shaped slot or gap.

The bristles 31 or 31' of the washing brush 10 or 10' can thus be caught and held in one of these gaps or slots or other structural irregularities and the rotation of the brush 10 or 10' can thus be stopped when the washing brush 10 or 10' reaches the center of the motor vehicle 1.

In this case the sensing elements 14 immediately respond to the halt and allows a speedy reversal of the rotation direction of the washing brush 10 or 10' so that no injury occurs.

The sensing element can be constructed to respond not to an absolute value of the current flow, but alternatively to the rate of increase of the current flow.

Figure 2A:
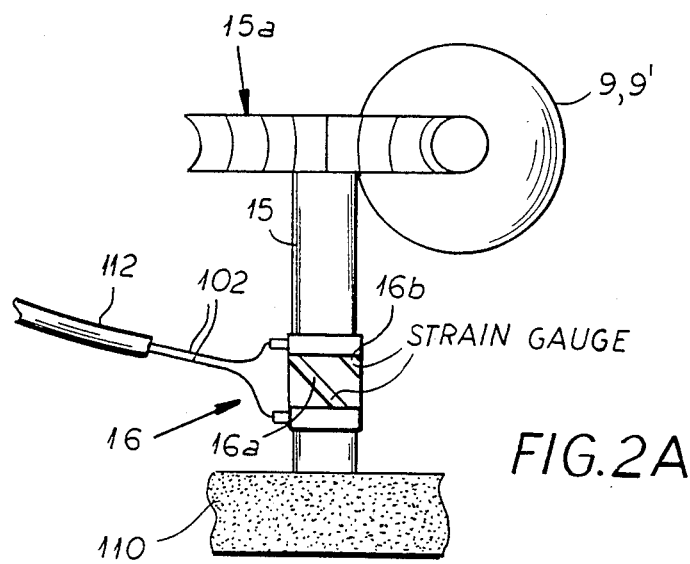
FIG. 2A is a diagrammatic detail of the sensor of the latter embodiment.
Figure 2:
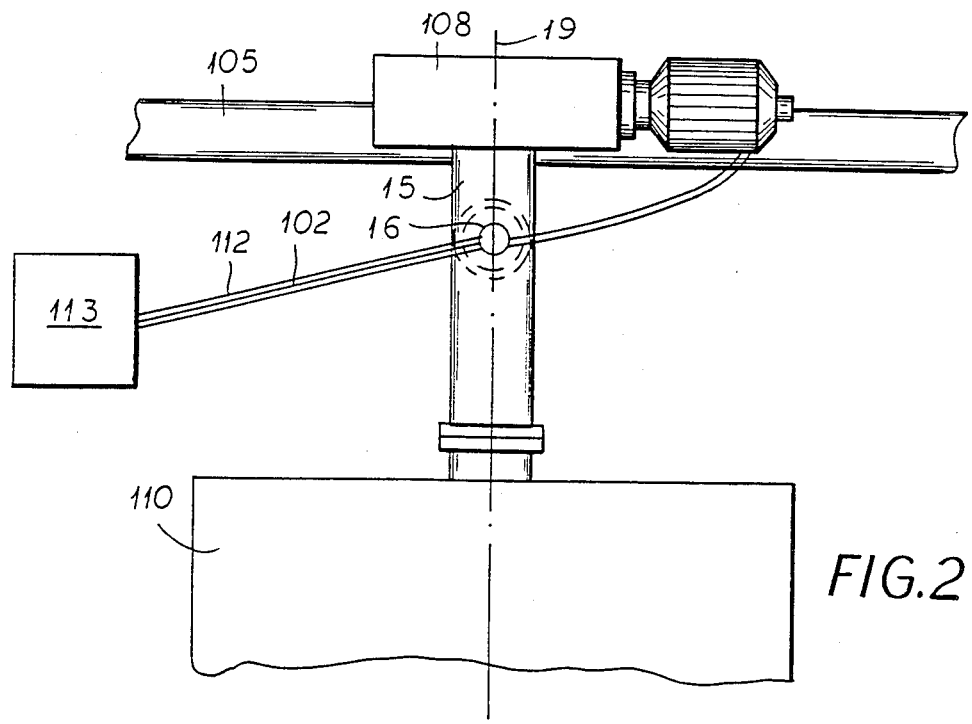
FIG. 2 is a portion of a front elevational view of a second embodiment of the automatic washing apparatus for an automotive vehicle.

In the second embodiment shown in FIG. 2 a torque produced by snagging or catching the washing brush 110' and transmitted via its supporting member 15 is detected by a sensing element 16, which transmits a command for control of the rotation direction of the washing brush drive 108 to the control mechanism 113 over a signal conductor 102, which is carried along by a flexible cable 112 running to the motor when a torque threshold value exceeds a predetermined limiting value.

The torque sensor 16 can have strain gauge strips 16a, 16b on the motor shaft 15 connecting the worm/worm gear drive 15a of the motor 9,9' to the brush 110.

Figure 3:
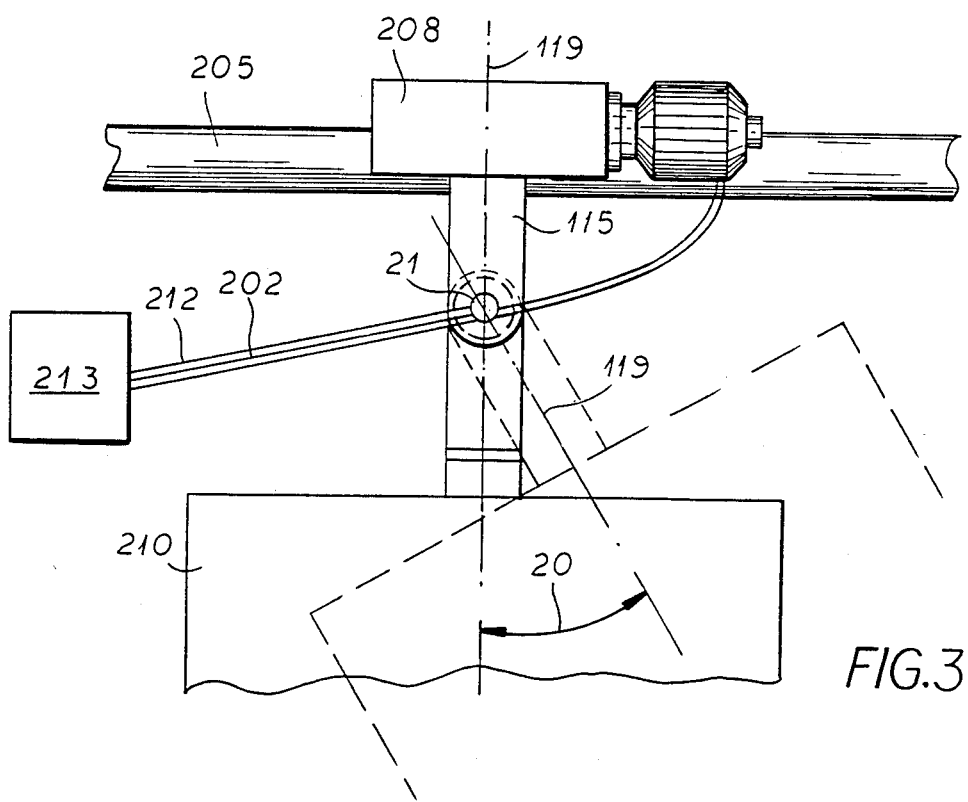
FIG. 3 is a portion of a front elevational view of a third embodiment of the washing apparatus for an automotive vehicle.

In a third embodiment shown in FIG. 3 substantially similar to the second embodiment shown in FIG. 2 the supporting member 115 of the washing brush 210 is elastic or a universal joint, so that on catching of the washing brush 210 and on further travel of the trolley 208 on the transverse rail 205 a slanted orientation of the rotation axis 119 of the washing brush 210 at an angle 20 occurs. A sensing element 21 mounted on the supporting member 115 acts on the control mechanism 213, when the actual angle 20 exceeds a threshold value and thus causes a reversal in the direction of rotation.

Figure 4:
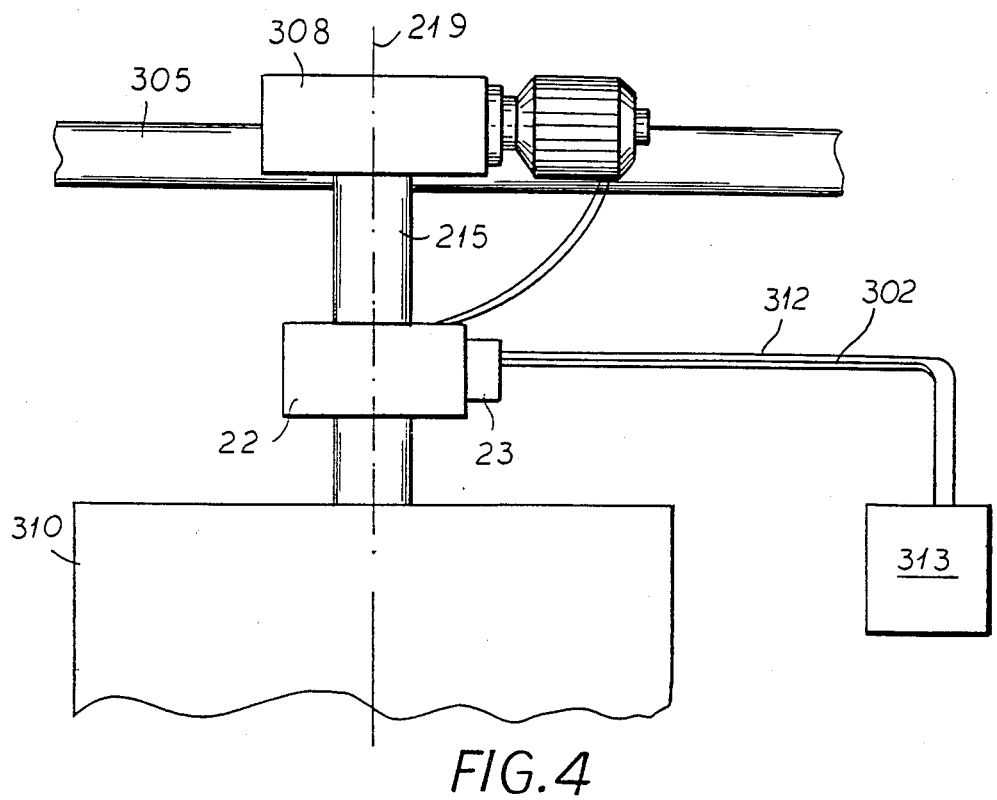
FIG. 4 is a portion of a front elevational view of a fourth embodiment of the automatic washing apparatus.

A fourth embodiment shown in FIG. 4 has a sensing element 23 which is attached to a washing brush drive mechanism 22, which reports the reduction of the rotation speed from its limiting value or the decrease in rotation speed to the control mechanism 313.

All the above embodiments operate in such a way that when the sensing elements transmit a signal for example to a control apparatus or otherwise respond the rotation direction is reversed.

A monostable reversing switch adjoining the sensing element is provided, which reverses the rotation direction of the washing brush drive only temporarily during a short time span corresponding to one wash brush reverse rotation.

Figure 5:
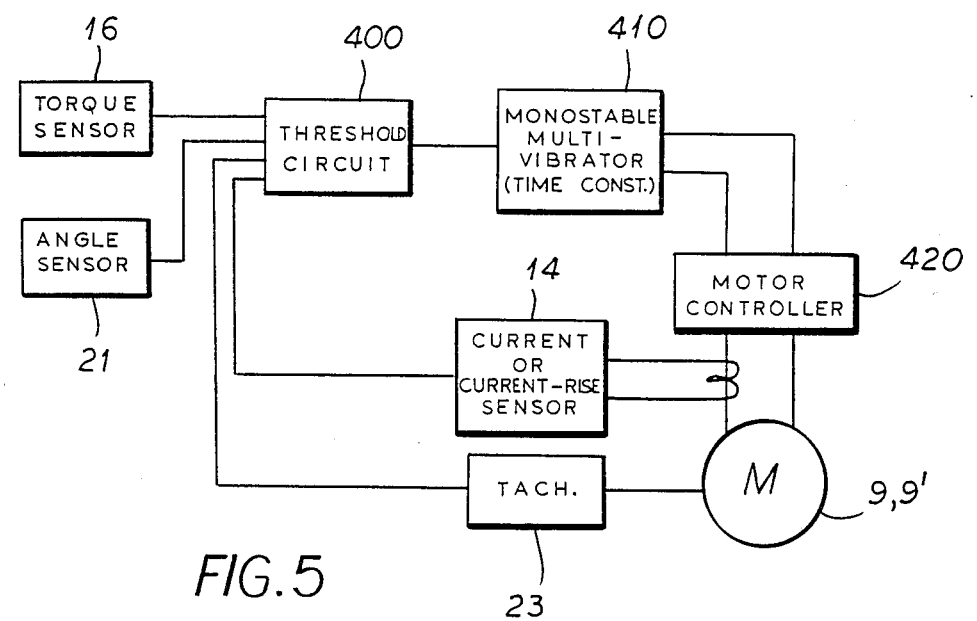
FIG. 5 is a block diagram illustrating the invention.

As can be seen from FIG. 5, each of the sensors 14, 16, 21, 23 is connected to a threshold circuit 400 whose output, should an incipient strain on the brush be detected is applied to a monostable multivibrator 410 with a time constant sufficient to allow a reversal of the motor to prevent jamming of the brush as described. The monoflop 410 is applied to a reversing controller 420 which reverses the brush for the time constant of the monoflop.

I claim:

1. In a washing apparatus for an automotive vehicle comprising at least one washing brush with a substantially vertically oriented rotation axis, a brush mechanism for guiding and transporting said washing brush on a course over and around said vehicle to be washed, and a control mechanism for said washing apparatus, the improvement which comprises:
    a sensing element connected to said control mechanism which responds to an incipient potentially detrimental catching of said washing brush during rotation thereof as it travels over said course; and
    means connected to said element for reversing the rotation direction of said washing brush by acting on said control mechanism.

2. The improvement according to claim 1 wherein at each and every response of said sensing element said direction of rotation of said washing brush is reversed.

3. The improvement according to claim 1 wherein at each and every response of said sensing element said directin of said rotation is reversed only temporarily during a short time span.

4. The improvement according to claim 1 wherein said sensing element responds when the decrease of said rotational speed of said washing brush exceeds a predetermined limiting value.

5. The improvement according to claim 1 wherein said sensing element responds when the reduction of the rotational motion of said washing brush exceeds a predetermined limiting value.

6. The improvement according to claim 1 wherein said sensing element responds when an angle at which said rotation axis is slanted exceeds a predetermined limiting value.

7. The improvement according to claim 1 wherein said sensing element responds when torque on a supporting member of said washing brush with said rotation axis in a slanted orientation exceeds a predetermined limiting value.

8. The improvement according to claim 1 wherein said sensing element responds when current used by the washing brush drive motor of said washing brush exceeds a predetermined value.

9. The improvement according to claim 1 wherein said sensing element responds when power used by the washing brush drive motor of said washing brush exceeds a predetermined limiting value.

10. The improvement according to claim 1 wherein said sensing element responds when a rate at which current drawn by the drive motor for said washing brush rises exceeds a predetermined value.

11. A washing apparatus for an automotive vehicle comprising:

at least one washing brush with a substantially vertically oriented rotation axis;

a brush mechanism for guiding and transporting said washing brush on a course over and around said automotive vehicle to be washed;

a control mechanism for control of said washing apparatus and including a reversing drive connected to said brush; and a sensing element connected to said control mechanism and responding to a restraining of said washing brush during rotation and travel of said brush over said course and connected to said control mechanism for reversing the rotation direction of said washing brush.

12. The washing apparatus defined in claim 11 wherein said washing brush is provided with an electric motor formed with a source of electric current and said sensing current is connected to respond to the electric power demand of said motor.

13. The apparatus defined in claim 12 wherein the driving direction of said motor is reversed for each and every response of said sensing element.

* * * * *